May 31, 1966
J. C. DANLY
3,253,868
BALL BEARING DIE SET
Filed July 5, 1963
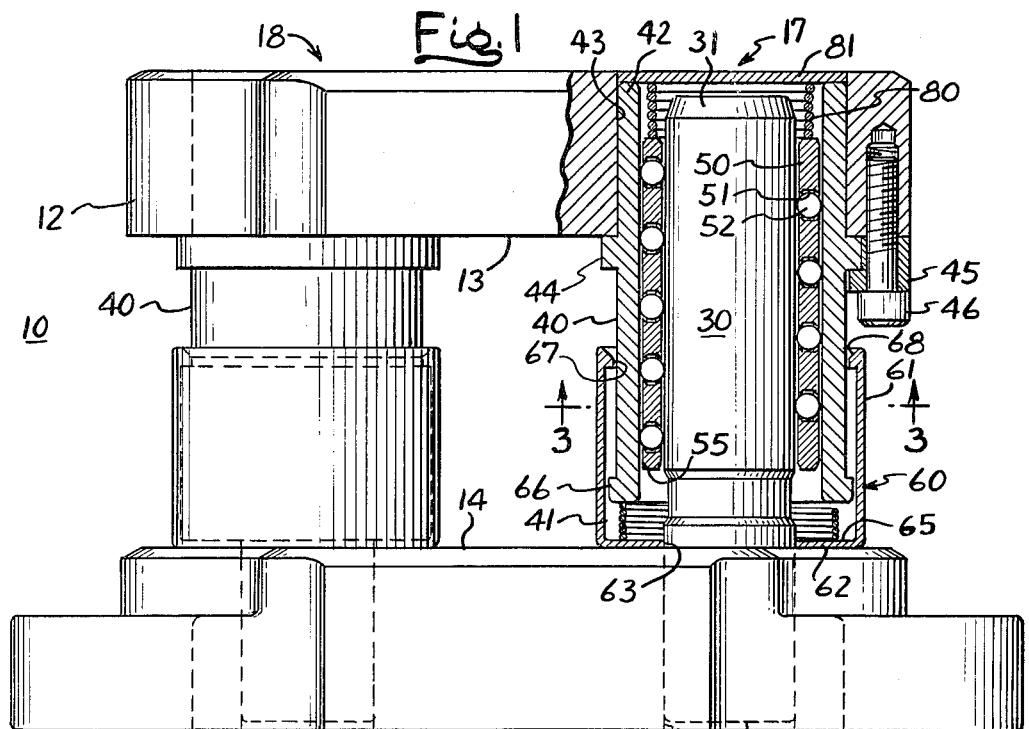
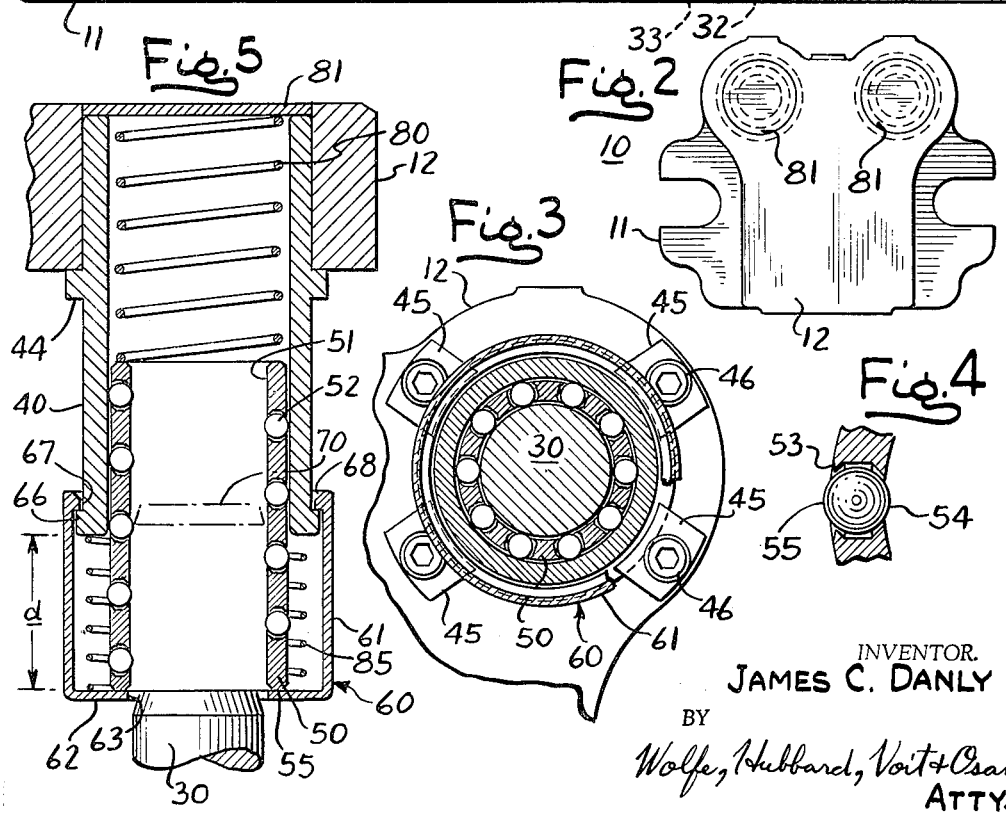
INVENTOR.
JAMES C. DANLY
BY
Wolfe, Hubbard, Voit & Osann
ATTYS.

United States Patent Office 3,253,868
Patented May 31, 1966

3,253,868
BALL BEARING DIE SET
James C. Danly, River Forest, Ill., assignor to Danly Machine Specialties, Inc., Chicago, Ill., a corporation of Illinois
Filed July 5, 1963, Ser. No. 293,113
1 Claim. (Cl. 308—6)

The present invention relates to die sets and more particularly to die sets of the ball bearing type.

For the purpose of reducing friction between the telescoped elements of a die set, particularly for high speed repetitive operation, it has been known to use a ball bearing sleeve between the relatively moving surfaces. However, die sets of the ball bearing type have not come into general usage because of the maintenance problems associated with this type of device and because of the hazard presented by the loss of a ball which may fall into the dies to produce a "smashup."

It is, accordingly, a general object of the present invention to provide a ball bearing die set which avoids the problems which have been connected with the use of such die sets in the past thereby opening up a much wider field of usage. Thus it is an object to provide a ball bearing die set in which there is no possibility that a dislodged ball might find its way between the cooperating dies. It is a related object to provide a ball bearing die set in which the ball bearing cage and the balls are completely enclosed and protected against the accumulation of dirt, the effect of steel chips, and the possibility of inadvertent damage from material handled through the dies. It is a related object to provide a ball bearing die set in which the ball bearings are sealed against entry of dirt or other foreign matter but in which the sealing means serves at the same time as a reservoir of lubricant thereby to insure that each ball is constantly lubricated with respect to the cage and the engaged bearing surfaces. Conseqently it is an object of the present invention to provide a ball bearing die set having a life which greatly exceeds that of conventional die sets of the ball bearing type.

It is another object of the present invention to provide means for insuring precise phase positioning of the ball cage with respect to the bushing and post when the latter are engaged so that a full stroke is available and avoiding the scuffing between the balls and the bearing surfaces which must take place where the ball bearing cage is out of phase position. Thus it is an object to provide a ball bearing die set which permits complete retraction of the post but where the ball bearing cage is positively and automatically located in proper position to receive the entering tip of the post when the parts are subsequently engaged. This is an especially important feature of the invention where the operation requires that the post be completely withdrawn during each repetitive cycle. In this connection it is a more specific object to provide a ball bearing die post in which the seating of the cage in its reference position is accomplished quickly with spring means to insure prompt followup in those applications where there is complete post and bushing separation and where the acceleration of the parts exceeds that of gravity. It is a related object to provide a ball bearing post and sleeve assembly which may be operated with either the post or sleeve in the upper position.

It is still another object of the present invention to provide a ball bearing die set in which the ball bearing cage remains captive with, and forms an integral part of, the bushing assembly to facilitate stocking, handling and assembly and which permits use with a plain ungrooved post. It is another object related to the foregoing to provide a construction which insures retention of the ball bearing cage but in which none of the bearing area need be lost or sacrificed to provide retaining grooves or the like. Since all of the bearing surfaces are smoothly continuous, all of the forces are symmetrical and any wear is equally distributed.

It is yet another object of the invention to provide a die set of the ball bearing type capable of rapid repetitive operation for high production applications, and having all of the advantages mentioned above but which nevertheless operates as smoothly and quietly as die sets of the conventional, slow speed sleeve type.

Finally it is an object of the invention to provide a ball bearing bushing assembly which may be easily and quickly assembled by snapping the parts together, and which discourages disassembly, but which may, nevertheless, be disassembled to replenish the lubricant or for periodic inspection.

Other objects and advantages of the invention will become apparent upon reading the attached detailed description and upon reference to the drawings in which:

FIGURE 1 is an elevation, partly in section, of a ball bearing die set constructed in accordance with the present invention.

FIG. 2 is a plan view corresponding to FIG. 1.

FIG. 3 is a fragmentary section looking along the line 3—3 in FIG. 1 and showing means for fastening the bushing in place.

FIG. 4 is a fragmentary section showing the manner in which each of the balls is staked in place in the cage or retainer.

FIG. 5 is a section, similar to that shown in FIG. 1, but showing the relationship of the parts upon full withdrawal of the post from the sleeve or bushing.

While the invention has been described in connection with a preferred embodiment it will be understood that I do not intend to be limited to the embodiment shown but intend to cover the various modifications and alternative constructions included within the spirit and scope of the appended claim.

Turning now to the drawings, a typical die set constructed in accordance with the present invention is indicated at 10 having a base or shoe 11 and a punch holder or slide 12 arranged parallel thereto. These elements provide upper and lower surfaces 13, 14 to which a punch and die, or cooperating set of dies, may be secured. It will be understood that the structure to be described relates the base and slide to provide precise rectilinear movement between them when the member 12 is raised and lowered by the slide of a power press.

The disclosed die set, in common with most die sets, includes two post and bushing assemblies indicated at 17, 18 respectively. Since they are identical, only the assembly 17 need be discussed in detail and corresponding reference numerals have been employed. Thus, secured to the base 11 is a guide post, or pin, 30 having a chamfered tip 31 and a base 32 which is press fitted into a bore 33. Concentrically arranged with respect to the post is a sleeve or bushing 40 having a lip 66 and a base portion 42 which is received in a bore 43 formed in the slide. The bushing includes an integral shoulder 44 which seats on the surface 13 of the slide. Firm and square seating is assured by means of a series of clamps 45, four in number, having clamping bolts 46 which are received in tapped holes in the slide.

Interposed between the post 30 and bushing 40 is a cylindrical bearing cage 50 having a two dimensional pattern of holes 51 containing ball bearings 52. As shown in FIG. 4, the ball bearings are held captive by staking or upsetting the lip of each of the holes as indicated at 53 with the balls, however, being left freely rotatable. The balls are slightly greater in diameter than the wall thickness of the cage so that they project inwardly, as indicated at 54, for engagement with the post and outwardly, as indicated at 55, for engagement with the inner surface of the sleeve. The tolerances are carefully controlled so that there is a slight interference fit, or preload, between the balls and the bearing surfaces which they engage. With regard to choice of material, it will be understood that the post, sleeve and balls are of alloy steel whereas the cage is preferably made of non-ferrous material such as brass or aluminum.

In accordance with the present invention, a combined shielding and retaining member is provided on the sleeve 40, slidably telescoped over the sleeve and having a central opening for passing the post 30 for completely enclosing the bearing cage. Further, in carrying out the invention, stops are provided on the retaining member and the sleeve for holding the retaining member captive and for accurately defining an extended, working position. Thus there is provided a retaining member 60 of cup shape having a cylindrical wall 61 and an end wall 62. Centrally formed in the end wall is a circular opening 63 for admitting the post 30 defining an internal land, or stop surface 65 which is in the path of movement of the lower end 55 of the bearing cage. For maintaining the retaining member 60 captive of the bushing, the end of the bushing is preferably provided with an integral lip 66 which extends outwardly and which cooperates with an inwardly facing lip 67 formed on the retaining member. The retaining member is preferably formed of resilient material such as medium to high density polyethylene, permitting sufficient radial expansion for the lip 67 on the retainer to snap over the lip 66 of the bushing, with detent action, during the initial assembly. To facilitate the assembly, and to guide the members over one another, at least one of them includes a tapered or chamfered surface as indicated at 68 in FIG. 1. The engaging surfaces of the two lips 66, 67, are, however, rectangular and sharply formed so that the retainer is constrained to an accurately defined, extended position and so that it is not possible to remove the retainer from the bushing except with intentional action, for example, with use of a prying tool, and as might be necessary, from time to time, for inspection purposes.

To understand the positioning function performed by the retaining member 60, reference is made to FIG. 5. Here it will be assumed that the post 30 has been fully withdrawn so that the bearing cage 50 and retainer 60 both occupy their lowermost, or fully retracted position, and with the bearing cage being extended a distance $d$ which corresponds to approximately one half of its length. By positioning the bearing cage as shown, the cage is in proper phase position to provide maximum stroke between the post and sleeve and avoids the "scuffing" between the balls and the surfaces which they engage which occurs, due to "bottoming," when the bearing cage is not in its proper initial phase condition.

Assuming that the post has been fully retracted in the position shown and that the bearing cage occupies its initial position, also as shown, the post may be reinserted, during a subsequent working cycle, up to the dotted position 70, without causing any corresponding upward movement of the bearing cage. The reason for this is that each of the balls has a certain amount of radial play, and, as the post is inserted, the balls in the lower portion of the cage move out of the way without applying any frictional loading. However, when the post passes the position 70, the balls are restrained by the inner surface of the bushing and advent of the post causes each of the engaged balls to be radially loaded. Thus the cage is propelled upwardly at one half the speed of telescoping movement between post and bushing until the cage again occupies the position shown in FIG. 1 in readiness for a subsequent cycle. During the approaching movement the lower surface of the retaining member 60 is engaged by the upper surface of the base 11 so that the lips 66, 67 separate, with the retaining member being telescoped substantially over the sleeve.

To summarize, where the die set is adjusted for complete separation, as illustrated in FIG. 5, it will be understood that the bearing cage will be restored to its proper initial phase position each time that the separation occurs. Upon each reengagement the chamfer at the upper end of the post 30 insures a smooth reengagement with the ball bearings even where a substantial degree of preloading has been employed. In the event that the post and bushing are not retracted to the point of actual separation, i.e., to a point where ball bearings are engaged, the bearing cage will tend to remain in its proper phase position over many cycles of operation.

Where the bearing cage and retaining member are dependently mounted on the punch holder or slide, as illustrated in FIGS. 1 and 5, and where the operation takes place at a relatively low speed or cyclical rate, it is possible to rely upon gravity to restore the bearing cage and retainer in the desired extended position. However, where the die set is employed in a high speed production press it is quite possible to achieve a relative acceleration between the post and sleeve which exceeds the acceleration of gravity. Thus, in accordance with one of the aspects of the present invention, means are provided, preferably in the form of a coil spring, for restoring the bearing cage to its precise extended position promptly when the post moves clear of the lip of the bushing, i.e., as soon as the balls are unloaded. In the present instance, this prompt follow-up action is brought about by a coil spring 80 which is formed of light spring metal and having a diameter which which corresponds substantially to the average diameter of the bearing cage and which presses endwise against the latter. Any desired means may be employed for seating the spring 80, for example, a disc 81 which is force fitted into the upper end of the bore 43 in the slide. Or, if desired, a threaded retaining cap may be used. In any event, it will be apparent that the bearing cage is restored to its proper extended position by the spring promptly without reliance upon gravity. As one of the features of this construction, the entire assembly may be inverted with respect to the base and slide so that the bushing and bearing cage occupy the lowermost position and in which it is necessary for the restoring movement to take place against, rather than with, the force of gravity. This provides a high degree of flexibility both in mounting and usage. To further assist in the positioning movement of the cage an auxiliary coil spring 85 may be employed within the retaining member, the effect of the two springs being additive.

One serious hazard which has in the past been considered inherent in the use of ball bearing die sets is eliminated by the present construction, provided only that the degree of separation of the post from the bushing does not exceed the length of the retaining member. While it is possible that a ball, due to wear or inaccurate staking may escape from the cage, it will be apparent that in the present construction it is impossible for the displaced ball to escape from the assembly and to be lodged between the cooperating dies resulting in their damage or destruction. Thus any ball which is dislodged inwardly of the cage is held captive by the post and any ball which is dislodged outwardly is confined by the retaining member itself. The resulting rattle as the die set is cycled gives accurate indication that a ball has been displaced so that a new ball cage may be substituted.

Of equal importance is the fact that the present construction serves to protect the balls and cage against factors which greatly shorten the life of conventional devices of this type. Thus, the balls and bearing surfaces are protected against entry and accumulation of abrasive dirt, steel chips and the like so that periodic cleaning or flushing are unnecessary. Moreover, it will be appreciated that the ball cage, in conventional constructions, is in an exposed position and susceptible to damage during installation of the dies or by impact with the material being handled through the dies whereas the parts are, in the present construction, protected against any impact.

In addition to the shielding effect it has been found that the present retaining member may be utilized as a reservoir for lubricant, such as grease or the like, with a sufficient amount of lubricant being picked up as a result of the reciprocating movement so that the assembly as a whole remains adequately lubricated over long periods of time. In this connection, the combination of the bushing, bearing cage and retaining member form a convenient unit for stocking and the retaining member, if desired, may be prelubricated incident to assembling it in the first instance.

It is to be noted that the bearing cage is limited to movement through the desired range without necessity for using any stops or grooves which affect the integrity of either of the two bearing surfaces. Thus a plain ungrooved post may be employed with the plain and ungrooved sleeve providing maximum bearing area and perfectly symmetrical application of bearing forces in all directions.

Because of the material of which the retaining member 60 is made, the effect is to insure quiet operation even at extremely high stroke rates. It may, nevertheless, be kept in mind that the invention is not limited to any particular material and if desired the retainer may be made of metal, for example, with narrow longitudinal slots being provided in the wall of the retainer in order to achieve the desired detenting action during assembly. And while the sharp edges of the engaging surfaces hold the retaining member securely captive, nevertheless it is a simple matter, employing an appropriate spreading or prying tool, to dislodge the retaining member when necessary for inspection or the like.

I claim as my invention:

In a ball bearing die set the combination comprising a base, a slide parallel thereto, a post and cooperating sleeve mounted in alined relation in the base and slide, a cylindrical bearing cage having captive balls spaced therein and interposed between the post and sleeve, a cup shaped retaining member telescoped over the end of the sleeve but having means for limiting the axial extension thereof, said retaining member having a central opening for passing the post but for defining a land to serve as a stop for said bearing cage thereby to limit the axial extension of the latter so that when the post is fully withdrawn the cage is located in proper phase position for subsequent entry of the post, and a first coil spring surrounding said post seated with respect to the sleeve at one end and bearing against the bearing cage at the other, and a second coil spring seated with respect to the cage at one end and pressing against the retaining member at the other thereby to insure that the bearing cage is promptly seated in extended position on the retaining member when the post is withdrawn substantially independently of the orientation of the post and the sleeve or the relative acceleration between them.

References Cited by the Examiner

UNITED STATES PATENTS

| | | | |
|---|---|---|---|
| 1,964,752 | 7/1934 | Wales | 83—637 X |
| 2,422,775 | 6/1947 | Conner | 308—6 |
| 2,625,163 | 1/1953 | Jones | 287—58 X |
| 2,782,921 | 2/1957 | Norman. | |
| 2,846,278 | 8/1958 | Blazek | 308—6 |
| 3,042,244 | 7/1962 | Van Hecke | 254—18 X |

DAVID J. WILLIAMOWSKY, *Primary Examiner.*

FRANK SUSKO, DON A. WAITE, *Examiners.*

L. L. JOHNSON, *Assistant Examiner.*